United States Patent [19]
Ravenel

[11] 3,741,042
[45] June 26, 1973

[54] ELECTRONIC CONTROL DEVICES FOR MULTISTAGE GEAR BOXES

[75] Inventor: Raymond Ravenel, Sceaux, France

[73] Assignee: Soviete Amonyme Automobiles Citroen, Paris, France

[22] Filed: Mar. 5, 1971

[21] Appl. No.: 121,253

[30] Foreign Application Priority Data
Mar. 10, 1970 France .............................. 7008571

[52] U.S. Cl. .................... 74/863, 74/866, 74/752 A
[51] Int. Cl. .......................... B60k 21/00, F16h 3/74
[58] Field of Search .................... 74/863, 866, 752 A

[56] References Cited
UNITED STATES PATENTS
| | | | |
|---|---|---|---|
| 3,121,483 | 2/1964 | Lietz | 74/863 X |
| 3,448,640 | 6/1969 | Nelson | 74/866 |
| 3,487,725 | 1/1970 | Brunot | 74/752 A |
| 3,572,168 | 3/1971 | Shirai et al. | 74/752 A |

Primary Examiner—Arthur T. McKeon
Attorney—Stevens, Davis, Miller & Mosher

[57] ABSTRACT

The vehicle is provided with an electronic computer for producing an injection control signal whose duration determines the time of opening of the injectors. The device is arranged so that the injection control signal acts, as a function of its duration, on a one or more thresholds of at least one threshold detector sensitive to the rotary speed of the engine and adapted to control the gear changes. Other parameters of the operation of the engine and the state of the load may be fed to the computer, for example the pressure in the intake pipe of the engine.

25 Claims, 15 Drawing Figures

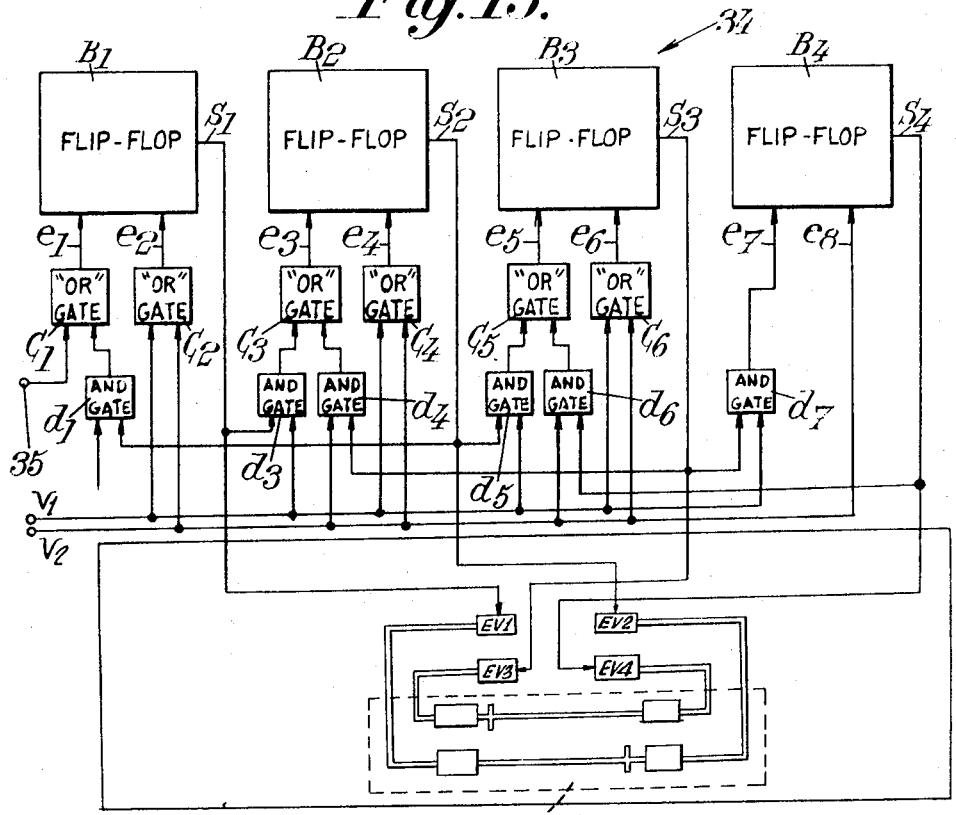
Fig. 13.
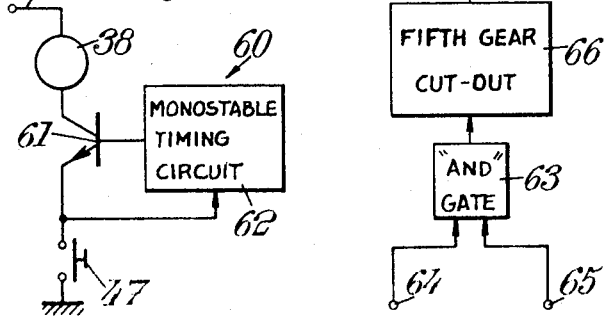
Fig. 14.
Fig. 15

ELECTRONIC CONTROL DEVICES FOR MULTISTAGE GEAR BOXES

The invention relates to improvements in electronic control devices for multistage gear boxes for electronic fuel injection automobile vehicles.

It is a particular object of the invention to make electronic control devices for gear boxes respond better to the various exigencies of practice than hitherto and especially to simplify them.

According to the invention, an electronic control device for a multistage gear box for an electronic fuel injection automobile vehicle, which vehicle is equipped with an electronic computer adapted to produce, from parameters of the operation of the vehicle engine, a fuel injection control signal whose duration determines the time of opening the injectors, is characterized by the fact that it is arranged so that the fuel injection control signal acts, as a function of its duration, on the one or more speed thresholds in stepped relation of at least one speed threshold detector sensitive to the rotary speed of the engine and adapted to control the changes of ratio of the gear box.

Preferably the electronic control device comprises two speed threshold detectors of which one controls the increase of speeds and the other controls decreasing speeds.

The control device comprises advantageously, on one hand, a saw tooth generator controlled by the injection control signal and adapted to supply a peak voltage proportional to the duration of the injection control signal, on the other hand, a memory adapted to retain the said peak voltage, and on the other hand lastly a circuit adapted to act on the speed threshold of the speed threshold detector as a function of the said peak voltage.

The electron computer can be arranged so as to supply information on the rotary speed of the engine in the form of a calibrated signal whose frequency depends on the said rotary speed of the engine; an integrator is then provided to transform the said calibrated signal into continuous voltage proportional to the frequency of the said signal, which continuous voltage is applied at the input of the one or more speed threshold detectors.

The invention consists, apart from the features explained above, of certain other features which are preferably used at the same time and which will be more explicitly explained below with regard to embodiments of the invention which will now be described in more detailed manner with reference to the accompanying drawings, but which are in no way limiting.

In the drawings :

FIG. 13 is a synoptic diagram of an addersubtractor used to control a gear box with four forward speeds ;

FIGS. 14 and 15, lastly, are diagrams of safety devices.

Figure 1:
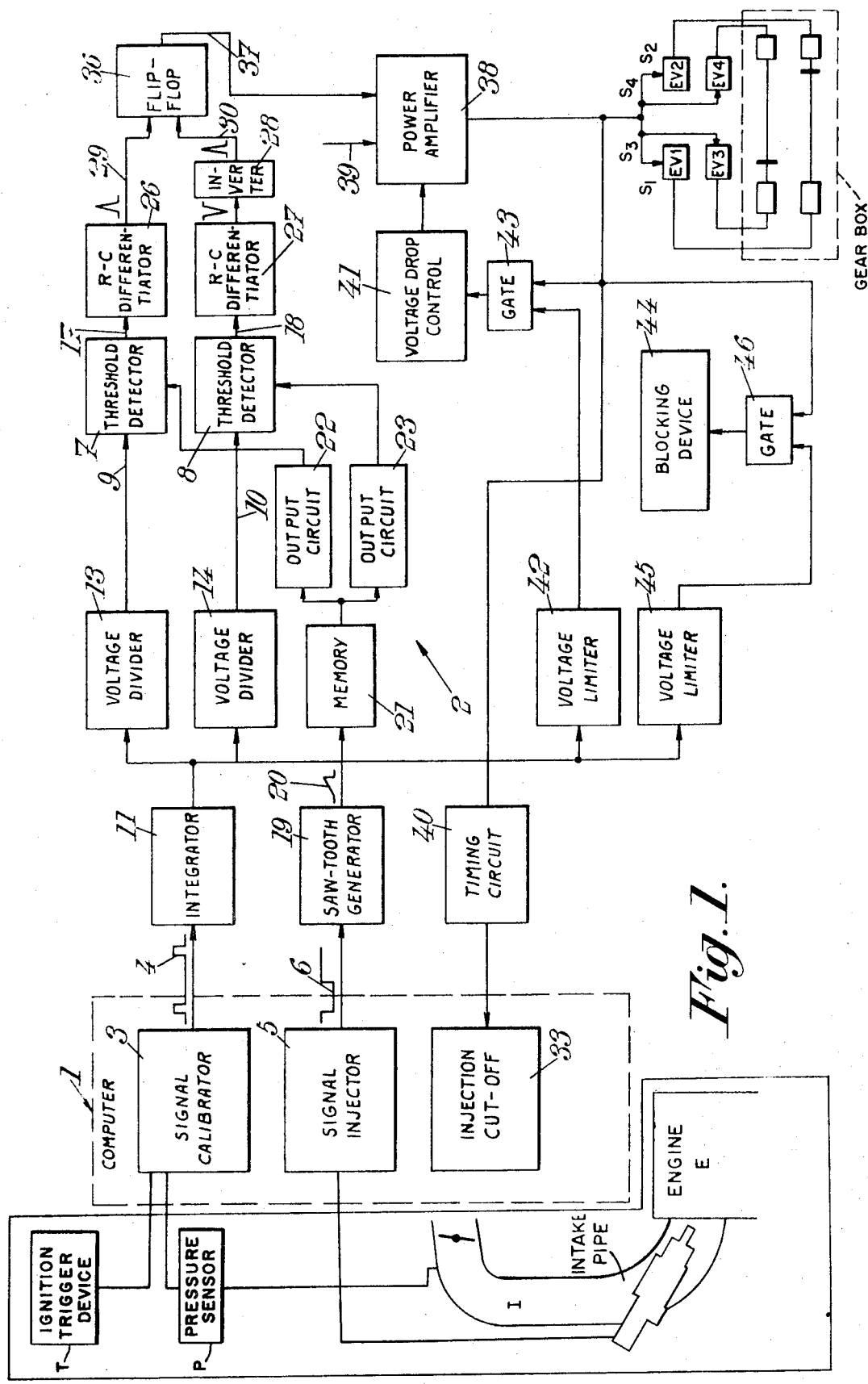
FIG. 1 is a synoptic diagram of an electronic control device according to the invention.

Referring to FIG. 1, it is seen that the electronic computer is denoted by the reference numeral 1 and that the electronic control device of the gear box is denoted as a whole by the reference numeral 2.

The electronic computer 1 receives information on the various parameters of operation of the engine E and especially on the rotary speed of the latter and on the absolute pressure in the intake pipe I. These two latter informations are supplied to the computer respectively through a trigger device T mounted on the ignition and through a pressure sensor P mounted in the intake pipe I.

Figure 2:
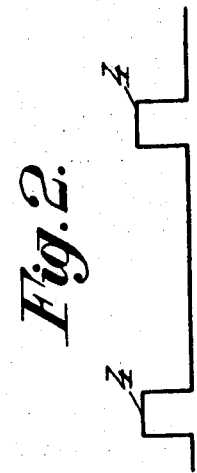
FIG. 2 shows a calibrated signal of which the frequency depends on the rotary speed of the engine.

The information on the rotary speed of the engine is put into form by a signal calibrator circuit 3 of the computer 1, before being used by the latter. The circuit 3 delivers, at its output, a calibrated signal 4 (FIG. 2) of which the shape is that of a rectilinear crenel or square wave of constant duration but of which the frequency varies with the rotary speed of the engine. For example, the frequency of the signal 4 can be proportional to the rotary speed of the engine as in applicant's U.S. Pat. No. 3,628,642.

The electronic computer 1 comprises an assembly 5 adapted to produce, from information received on the paramaters of operation of the engine, an injection control signal 6 (FIG. 4) of which the duration $t_i$ determines the time of opening of the injectors. The frequency of the signal 6 is equal to that of the signal 4.

The electronic control device comprises at least one and preferably two threshold detectors 7 and 8 such as SCHMITT flip-flops for instance as in applicant's U.S. Pat. No. 3,628,642, column 6, lines 67 - 69.

The inputs 9 and 10 of the detectors 7 and 8 are subjected to an electric voltage which depends on the rotary speed of the engine. This electric voltage is obtained in the following manner.

The signals 4, issuing from the circuit 3, are applied to the input of an integrator 11 which delivers, at its output, a D.C. voltage proportional to the frequency of the said signals 4. Such integrators are well-known e.g. as described at page 518 of Electronic Devices and Circuits by J. Millmann and C.C. Halkias (McGraw-Hill, 1969). This frequency being, generally, proportional to the rotary speed N of the engine, the voltage delivered by the integrator 11 is proportional to N and the variations in voltage as a function of N are shown by the straight segment 12 of FIG. 3, drawn in a solid line.

The voltage at the output of the integrator 11, is applied to two voltage dividers 13 and 14 which supply, at their output, D.C. voltages also proportional to the rotary speed of the engine but with different coefficients of proportionality.

Figure 3:
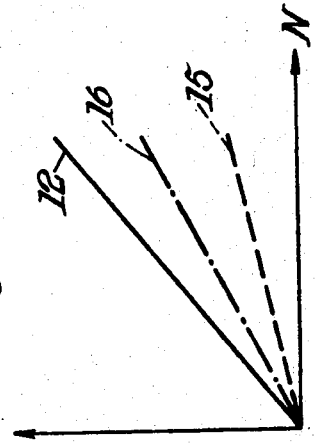
FIG. 3 shows the variations as a function of the rotary speed of the engine of the voltages obtained at the outputs of the various circuits.

Variations in the output voltage of the divider 13 as a function of the rotary speed N are shown by the straight segment 15 drawn in discontinuous lines in FIG. 3.

The variations in voltage at the output of the divider 14 are represented by the straight segment 16 drawn in mixed lines in FIG. 3.

The outputs of the voltage dividers 13 and 14 are connected, respectively, to the inputs 9 and 10 of the detectors 7 and 8. Such detectors are well-known e.g. as described in U.S. Pat. No. 3,433,101, column 6, lines 60-64; or as in U.S. Pat. No. 3,628,642, column 10, lines 41 – 72.

The output 17, of the detector 7, passes from the logical state "0" to the logical state "1" when the voltage applied to the input 9 becomes greater than the voltage at the change-up threshold. The output 17 passes from the state "1" to the state "0" when the voltage applied to the input 9 becomes less than a voltage at a change-down speed threshold which change-down speed voltage, by reason of a phenomenon of the hysteresis type, is less than the voltage at the change-up speed threshold.

It is likewise for the output 18 of the detector 8.

According to the invention, the change-up threshold for each detector or flip-flop 7, 8 is modified as a function of the duration $t_i$ of the injection control signal 6 in the manner explained below. The change-down threshold is moved in the same sense as the change-up threshold.

Figure 4:
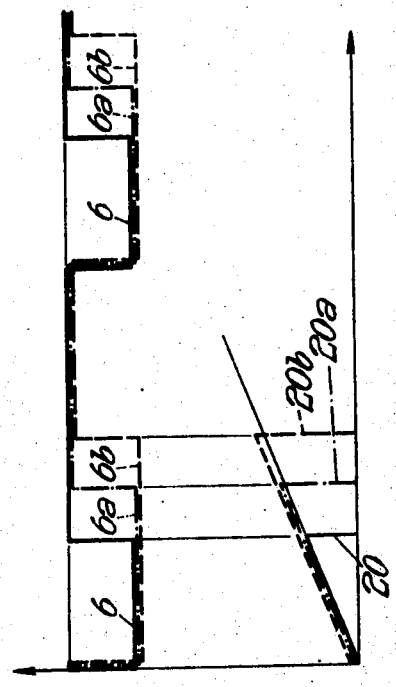
FIG. 4 shows in its upper portion the injection control signals and in its lower portion the saw-teeth provided by the generator controlled by the abovesaid signals.

The control signal 6 is used to synchronize and control a saw tooth generator 19. Such saw-tooth generators are well-known (see, for instance, the book by M. Schreiber, Technique et Application des transistors, (Editions Radio, Paris, 1965), pages 319 – 320. As shown in FIG. 4, where the time is borne as abscissae, and the electrical voltage is borne as ordinates, to three control signals 6, 6a, 6b of different durations will correspond three saw teeth 20, 20a, 20b of different lengths. The peak voltage of each saw tooth is proportional to the duration of the corresponding injection control signal.

A memory circuit 21 is provided to place in the memory the peak voltage delivered by the saw tooth generator 19. This memory circuit can be constituted by a condenser, of which the discharge time constant is adjustable, for instance by a variable resistance, as is well-known per se, mounted in series with a diode which enables the charging of the condenser by the saw tooth and opposes discharge in the absence of saw tooth. The said discharge time constant enables a time delay to be applied to the charging signal The memory circuit 21 supplies a D.C. voltage equal to the peak voltage of the saw tooth, this D.C. voltage being proportional to the duration of the injection control signal 6. The said voltage is held, in the case of momentary cut-off of the injection, due to the memory circuit 21.

Figure 5:
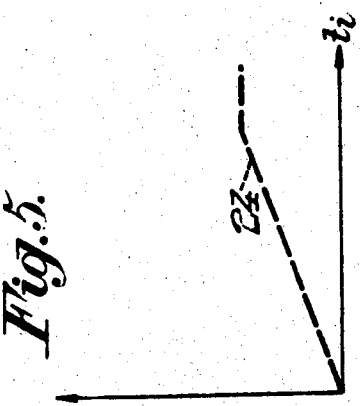

The continuous voltage supplied by the memory 21 varies proportionately as a function of $t_i$, the duration of the injection control signal. This D.C. voltage is treated in a circuit 22 so that at the output of this circuit the variations in voltage as a function of $t_i$ are no longer proportional but are represented by the curve 24, drawn in discontinuous lines, in FIG. 5. The D.C. voltage obtained at the output of circuit 22 is compared to the change-up threshold itself of the threshold detector 7.

If the change-up threshold itself of the detector 7 is greater than the voltage emerging from the circuit 22, the change-up threshold of the detector remains equal to the threshold itself.

If the threshold itself is less than the output voltage of the circuit 22, the change-up threshold of the detector 7 is increased and becomes greater than the threshold itself and, for example, equal to the voltage emerging from the circuit 22.

Figure 6:
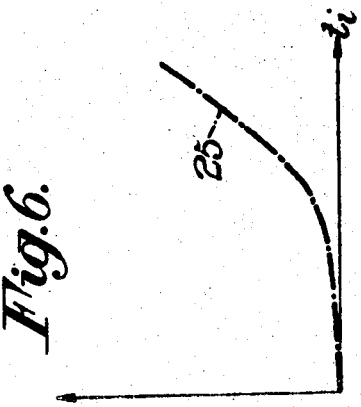
FIGS. 5 and 6 show respectively, after suitable treatment of the peak voltage of the saw teeth of FIG. 4, the variations in the voltage thus treated as a function of the duration of the injection control signal.

Similarly a circuit 23 treats the voltage emerging from the memory 21 so that at the output of the said circuit 23, the variations of the voltage as a function of $t_i$ are shown by the curve 25, in mixed lines, of FIG. 6. The output voltage of the circuit 23 is compared with the change-up threshold itself of the detector 8 and acts on the detector 8 in the way explained previously for the output voltage of the circuit 22 and the detector 7.

The outputs 17 and 18 of the detectors 7 and 8 are connected respectively to differentiator circuits R-C, 26 and 27. Such differentiator circuits are well-known (see, for instance, the book by Millmann et al, page 519).

The circuit 26, on one hand, gives at its output a positive pulse when the output 17 of the detector 7 passes from the "0" state to the "1" state and, on the other hand, does not give a pulse when the output 17 passes from the "1" state to the "0" state.

The circuit 27, on one hand, gives at its output a negative pulse when the output 18 of the detector 8 passes from the "1" state to the "0" state and, on the other hand, does not give a pulse when the output 18 passes from the "0" state to the "1" state.

The threshold detector 7 serves to control the speed increase. The useful change of state, at the output of this detector, is the passage from the "0" state to the "1" state or positive front.

The assembly is arranged so that the detector 8 passes from the "0" state to the "1" state before the detector 7 when the speed of rotation of the engine increases.

There will be now described how the different circuits studied previously operate and how the positive pulses are obtained on the outputs 29 and 30.

Figure 8:
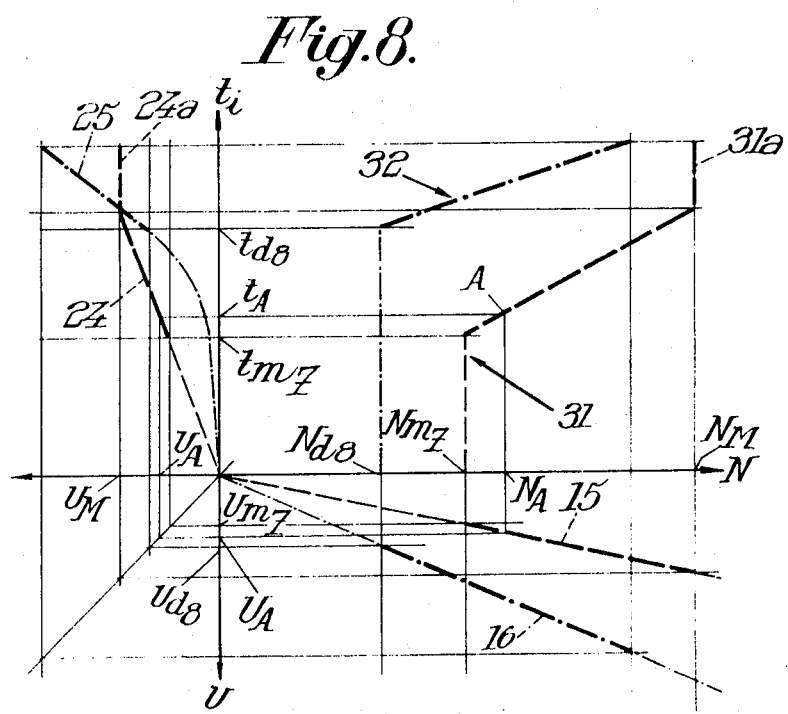
FIG. 8 shows a diagram of the conditions of changeover of the speed threshold detectors.

Reference will first by made to FIG. 8. In the lower right quadrant the straight segments 15 and 16 of FIG. 3 have been drawn, the horizontal axis for this quadrant being oriented from left to right and graduated in rotary speeds of the engine, the vertical axis being oriented from above to below and graduated in electrical voltages U. In the upper left quadrant the curves 24, 25 of FIGS. 5 and 6 have been drawn, the horizontal axis, for this quadrant, being oriented from right to left and graduated in electrical voltages whilst the vertical axis is oriented from below to above and graduated in duration $t_i$ of the injection control signal.

It will be noted that the duration $t_i$ of the injection control signal constitutes an evaluation of the load of the engine since the greater the power exerted by the latter, the greater the amount of fuel which must be injected and the greater is $t_i$.

The normal change-up threshold voltage of the detector 7 will be denoted by $Um_7$. The normal change-down threshold voltage of the detector 8 will be denoted by $Ud_8$.

The voltage $Um_7$ is obtained at the input 9 of the detector 7 and hence at the output of the voltage divider 13 when the rotary speed of the engine reaches the value $Nm_7$.

Similarly, the voltage $Ud_8$ is obtained at the output of the voltage divider 14 when the rotary speed of the engine reaches the value $Nd_8$.

As long as the duration of the injection signal is less than a value $tm_7$, the voltage at the output of the circuit 22 (shown by the curve 24) is less than the normal change-up threshold voltage $Um_7$ of the detector 7. Passage from the state "0" to the state "1" of the output 17 of this detector and a positive pulse on the output 29 will be obtained when the rotary speed of the engine passes through increasing values of the value $Nm_7$.

When the duration of the injection signal becomes greater than $tm_7$, the change-up threshold voltage of the detector 7 is modified and becomes, for example, equal to the voltage obtained at the output of the circuit 22. For a duration $t_a$, the circuit 22 delivers at its output a voltage $U_a$ which determines the new change-up threshold of the detector 7. This voltage $U_A$ will be passed, at the output of the voltage divider 13 and hence at the output 9 of the detector 7, when the rotary speed of the engine passes, in increasing, the value $N_A$. the point A belongs therefore to the graphical representation 31 of the relationship of passage from the state "0" to the state "1" of the output 17 or the relationship for the obtaining of positive pulses at the output 29.

The curve 24 has a portion 24a of abscissa $U_M$, substantially parallel to the axis of the $t_i$. To this portion 24a corresponds, on the curve 31, a portion 31a, parallel to the axis of $t_i$ and abscissa $N_M$ corresponding to a maximum rotary speed admissible for the engine.

By pursuing the same reasoning, there would be obtained the graphical representation 32 of the relationship for the passage from the state "1" to the state "0" of the output 18 or the relationship for obtaining positive pulses on the output 30.

Figure 9:
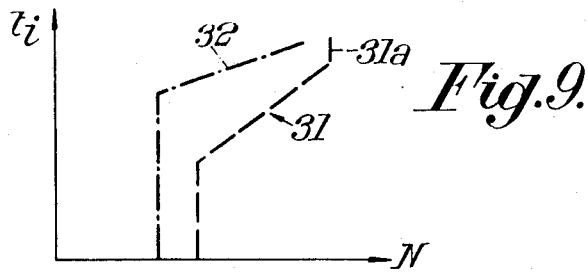
FIG. 9 shows the relationship for change-over obtained for the construction shown in FIG. 8.

These two graphical representations 31 and 32 have been drawn more clearly in FIG. 9.

Figure 10:
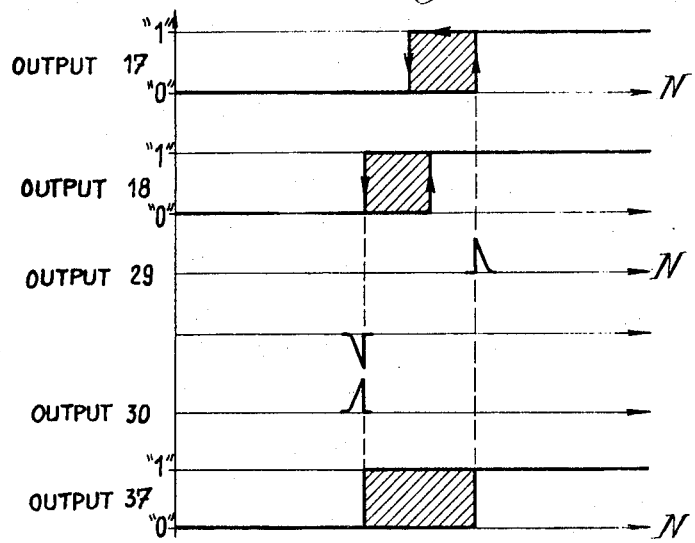
FIG. 10 is a diagram showing the states of the speed threshold detectors as a function of the rotary speed of the engine, of the control pulses obtained and the states of a flip-flop controlled by the pulses.

In FIG. 10 there is shown diagrammatically, at the highest line, the changes of state of the output 17 of the detector 7, then, on the following line, the changes of state of the output 18 of the detector 8, when the rotary speed of the engine increases from zero to the maximum value then decreases to zero. On the third line of FIG. 10, there is shown the positive pulse obtained at the output 29 of the circuit 26 on passage of the detector 7 from the state "0" to the state "1". On the fourth line there is shown the negative pulse obtained at the output of the circuit 27 on passage of the detector 8 from the state "1" to the state "0" and on the fifth line the positive pulse obtained at the output 30 of the inverter 28, which positive pulse is deduced from the last negative pulse. Such inverters are well-known (see, for instance, the book by Millmann et al. page 517).

The positive pulse on the output 29 is used to control, as described below, changing-up by one gear. This positive pulse is used to control, also, a momentary cut-off of the injection so as to cause the speed of the engine to fall when a higher ratio of the gear box is passed.

Generally a circuit 33 is already provided in the computer 1 for the injection cut-off and it suffices to provide a control of the said circuit 33 by the abovesaid positive pulse to obtain cut-off of injection on changing-up by one gear. It will be noted that, on passage from a higher ratio of the gear box, the rotary speed of the engine drops and causes restoration to the state "0" of the output 17 of the detector 7. The latter is hence ready to actuate a further change in gear in the direction of changing-up.

The positive pulse on the output 30 is used to actuate, as described below, changing-down by one gear. As soon as a low ratio of the gear box is passed, the speed of the engine rises again and causes the restoration to the state "1" of the output 18 of the detector 8. The latter is hence ready to actuate a further change-down if the speed of the engine drops further.

Memory circuits may be provided between the voltage dividers 13, 14 and the detectors 7 and 8, which memory circuits extend to the input of the information detectors of change-up or change-down of gears and mask the opposite information which could appear after the change-up or change-down by one gear following transitory variation of the engine speed. For example on change-up by one ratio, the transitory drop in speed of the engine, which follows this change-up could cause a change-down. A memory circuit arranged between the voltage divider 14 and the detector 8 would permit the masking of this rapid and transitory drop of the engine speed.

There will now be described devices provided for using the positive pulses which appear at the outputs 29 and 30 and to cause the change-up or change-down of the gear box.

There will first of all be considered the case where all the forward speed ratios of a gear box are automatically controlled. To establish ideas, it is assumed that the gear box comprises four forward speed ratios.

A first solution consists in using the change-up and change-down pulses to pilot, in known manner, a "step by step" control device of a hydraulic distributor controlling the changes in ratio of a gear box by hydraulic jacks. This known device will not be elaborated upon ; it is particularly used in U.S. Pat. No. 3,628,642 of applicant.

A second solution, which will now be described, consists in using an electronic addersubtractor 34 of which the synoptic diagram is shown in FIG. 13.

The adder-subtractor is an entirely static switching device comprising a certain number of logical two state stages "0" and "1" in cascade, of which one alone is in the "1" state, all the others being necessarily in the "0" state at a given moment, associated with "AND"and "OR" logic circuits enabling "Input-Output" couplings such that if control pulses are applied on an input channel, the state "1" only progresses by one stage to the following whilst if the control pulses are applied on the second input channel, the same state "1" only regresses by one stage to the preceding one. Such "AND" and "OR" logic circuits are well-known (see, for example, U.S. Pat. No. 3,448,640, column 9, line 8).

There are numerous ways of producing an adder-subtractor, with different techniques, but the principle of control is always the same : apply pulses either to a counting channel (progression), or to a subtracting channel (regression), knowing that at the start one stage and only one is in the "1" state.

The adder-subtractor 34 used comprises four stages, i.e. a stage per ratio of the gear box.

Each stage comprises a bistable flip-flop $B_1, B_2, B_3, B_4$ with two distinct inputs respectively $e_1$ $e_2$ for the flip-flop $B_1$, $e_3, e_4$ for the flip-flop $B_2$, $e_5$ $e_6$ for the flip-flop $B_3$ and $e_7$ $e_8$ for the flip-flop $B_4$.

The adder-subtractor 34 comprises two input channels respectively $V_1$, progression channel, and $V_2$ regression channel.

The two inputs of the flip-flops $B_1, B_2, B_3$ are connected to the outputs of the "OR" gates denoted by the references $C_1, C_2, C_3, C_4, C_5, C_6$.

One input of the gate $C_1$ is connected to the "forward drive" input terminal 35 on which a positive pulse is sent, due to a selector (not shown) for example, when the automatic forward drive is desired. A second input from the gate $C_1$ is connected to the output of the "AND" gate denoted by the reference $d_1$. This gate $d_1$ has two inputs connected respectively to the channel $V_2$ and to the output $S_2$ of the flip-flop $B_2$.

The "OR" gates $C_2, C_4$ and $C_6$ have two inputs connected respectively to the channels $V_1$ and $V_2$.

The gate $C_3$ has two inputs connected respectively to the outputs of the two "AND" gates $d_3, d_4$.

The gate $d_3$ has two inputs connected respectively to the output $S_1$, of the flip-flop $B_1$ and to the channel $V_1$.

The gate $d_4$ has two inputs connected respectively to the channel $V_2$ and to the output $S_3$ of the flip-flop $B_3$.

The gate $C_5$ has two inputs connected respectively to the outputs of the two "AND" gates $d_5, d_6$.

The gate $d_5$ has two inputs connected respectively to the output $S_2$ of the flip-flop $B_2$ and to the channel $V_1$.

The gate $d_6$ has two inputs connected respectively to the channel $V_2$ and to the output $S_4$ of the flip-flop $B_4$.

The input $e_7$ of the flip-flop $B_4$ is connected to the output of an "AND" gate $d_7$. The latter has two inputs connected respectively to the output $S_3$ of the flip-flop $B_3$ and to the channel $V_1$.

The input $e_8$ of the flip-flop $B_4$ is connected to the channel $V_2$.

The outputs $S_1, S_2, S_3, S_4$ control, through amplifying circuits (not shown) electrovalves $EV_1, EV_2, EV_3, EV_4$ which are subjected to a voltage when the corresponding output is in the "1" state. Each electrovalve corresponds to one gear ratio respectively 1st, 2nd, 3rd, 4th. When an electrovalve is subjected to a voltage, the corresponding gear ratio is engaged.

The channels $V_1$ and $V_2$ are connected respectively to the outputs 29 and 30 (see FIG. 1).

The operation of the adder-subtractor 34 for the automatic control of the gear changes is as follows.

On the application of a voltage, the four outputs $S_1, S_2, S_3, S_4$ are in the "0" state, which corresponds to the "top-dead center".

To obtain an automatic forward speed, a positive pulse is sent to the input 35 by means of a selector. This pulse is transmitted to the input $e_1$ and the output $S_1$ passes to the "1" state. The electrovalve $EV_1$ is subjected to a voltage and the first gear is engaged. The vehicle can start off.

If a positive pulse coming from the output 29 (FIG. 1) arrives at the channel $V_1$, it is applied to the inputs $e_2, e_4, e_6$ through the "OR" gates $C_2, C_4, C_6$. Since the outputs $S_2$ and $S_3$ are in the "0" state, this pulse does not cause any change in state of the said outputs. Only the input $S_1$ passes from the "1" state to the "0" state. The electrovalve $EV_1$ is no longer subjected to a voltage and the first gear is disengaged.

Simultaneously the positive pulse on channel $V_1$ has been able to reach the input $e_3$ of the flip-flop $B_3$ since the two inputs of the "AND" gate $d_3$ are in the "1" state whilst the output $S_1$ has not returned to the "0" state. The gate $d_3$ is hence open and allows a pulse to pass which arrives at $e_3$ through the "OR" gate $C_3$. The output $S_2$ from $B_2$ passes from the "0" state to the "1" state, the electrovalve $EV_2$ is subjected to voltage and the second gear is engaged.

The changing up or changing-down through the other gears would be explained in a similar manner.

It may be advantageous or necessary to have a certain interval of time between the application of voltage to an electrovalve and the cut-off of the previous one. This result may be easily obtained by adding, to the device described above, time-delay circuits or retarding devices, without changing anything in principle.

In a variation, if it is desired that the selector delivering a pulse on the terminal 35 should only give a simple permission, without actuating the engagement of the first gear, it suffices to add a flip-flop $B_o$ (not shown) actuated like $B_1$ but of which the output $S_o$ will be only connected to one "AND" gate which will be added to the gate $d_1$ of the input $e_1$. The arrangement will then be the same for the input $e_1$ of the flip-flop $B_1$ as for the input $e_3$ of the flip-flop $B_2$. Under these conditions, the electrovalve $EV_1$ will only be subjected to voltage on the first positive pulse on channel $V_1$.

There will now be considered the case where it is desired to actuate automatically only the changing down from the maximum ratio of the gear box to the ratio immediately below, or the changing up of the latter to the maximum ratio. For example, it is desired to actuate automatically the changing down from 5th to 4th, or changing up from 4th to 5th, the other ratios being actuated manually.

The electronic device which will use the positive pulses which appear at the outputs 29 and 30 is reduced to a bistable flip-flop 36 (FIG. 1), with two inputs connected respectively to to the outputs 29 and 30. Such bistable flip-flop circuits are well-known (see, for example, the book by Millmann et al, aforementioned).

The output 37 of the bistable flip-flop 36 actuates a power amplifier stage 38, which can be a conventional device or one which functions like a relay, intended to apply a voltage to an electro-valve EV when the output 37 is in the "1" state. When the electrovalve EV is subjected to voltage, the 5th gear is engaged.

An input 39 is provided on the amplifier stage 38 so that the latter can only subject the electrovalve EV to a voltage when permission is given on the input 39, for example, when the manual selector is in the 4th position.

A time-delay circuit 40 has its input connected to the output of the stage 38 and its output connected to the input of the injection cut-off circuit 33 of the computer 1. Such time delay circuits are well-known (see, for example the book by Schreiber, abovementioned, pages 301 and 302 (FIG. 415). The time-delay circuit 40 enables, on passage from 4th to 5th to use the application of the voltage to the electrovalve EV to actuate for a certain time and with a certain delay the injection cut-off and to obtain, as previously explained, as perfect as possible an engagement of the gear ratios without racing of the engine. The circuit 40 can comprise several monostable RC circuits.

Various safety devices are provided also.

Firstly a device 41 actuates the maintenance of the voltage on the electrovalve EV when the latter is effectively under a voltage (i.e. when it is in 5th) and when the speed of the engine is increased and above a certain level.

For this, a circuit 42 of which the input is connected to the output of the integrator 11 determines the abovesaid level. The output of the circuit 42 is connected to an input of an "AND" gate 43.

A second input of this gate 43 is connected to the output of the stage 38. The output of this gate 43 is connected to the input of the device 41.

When the speed of the engine is greater than a certain level and when the electrovalve EV is subjected to a voltage, a signal is transmitted through the gate 43 and the device 41 actuates the holding of the electrovalve EV, even in the case of failure of the bistable flip-flop 36.

A blocking control 44 of the manual selector, in the 4th position, is provided to prevent, when the 5th gear is engaged, a possible changing down from 5th to 3rd at high engine speed. A circuit 45, of which the input is connected to the output of the integrator 11, determines the level of the engine speed above which the blocking of the selector must be actuated when fifth is engaged.

The output of the circuit 45 is connected to an input of an "AND" gate 46. A second input of this gate 46 is connected to the output of the stage 38. The output of the gate 46 is connected to the input of the blocking control 44.

The latter will only actuate the locking of the selector when a signal is present on the output of the gate 46, i.e. when the two inputs of the gate 46 are subjected to a signal. This occurs when the 5th gear is engaged (electrovalve EV subjected to a voltage) and when the speed of the engine is greater than the level predetermined by the circuit 45.

The circuits 42, 45 may be of the SCHMITT flip-flop type with very slight hysteresis or simply constituted by a voltage comparator such as a transistor whose emitter potential is fixed by a voltage divider, the base of the transistor receiving the signal coming from the integrator 11.

The operation of the various safety devices described above emerges immediately from their description.

The operation of the bistable flip-flop 36 is as follows.

When a positive pulse appears on the output 29, the output 37 of the flip-flop 36 passes from the "0" state to the "1" state and the 5th gear is engaged if the selector is in the 4th position. The change in state of the output 37 is shown in the last line of FIG. 10.

When a positive pulse appears on the output 30, the output 37 passes from the "1" state to the "0" state and the gear change from 5th to 4th occurs.

It will be noted that in the case where two threshold detectors 7 and 8 are provided, the hysteresis of each detector itself, shown by the hatched zones of the two first lines of FIG. 10, is not used.

In a simplified variation, only a single detector 7 or 8 could be used to control at the same time changing up and changing down, by taking advantage of the hysteresis of the detector to have different thresholds for changing up and for changing down.

Figure 7:
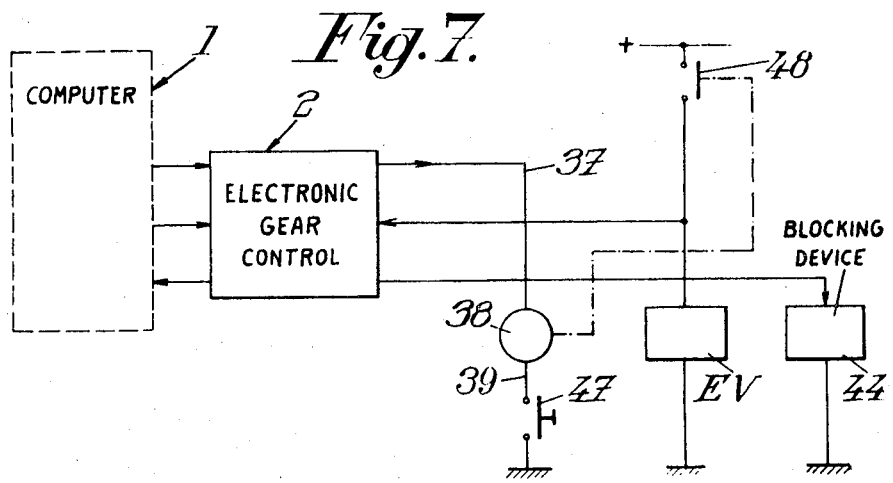
FIG. 7 is a diagram of an embodiment of the device for the control of the gear changes.

In FIG. 7, there is shown diagrammatically one embodiment where the stage 38 is constituted by a control relay of the electrovalve EV. When the output 37 is in the "1" state, a contact 48 is closed by the relay 38 and the electrovalve is connected to the + pole of a D.C. source.

The blocking control 44 of the selector is constituted by an electromagnet.

A contact 47 is provided to connect, when it is closed, the input 39 to ground and to permit the energizing of the control relay 38. The contact 47 is closed when the selector is in the 4th position.

It has previously been stated that the duration $t_i$ of the injection signal 6 depended on several operating parameters of the engine such as the speed of rotation of the latter and the absolute pressure in the intake pipe. These two parameters are the most important for the production of the signal 6, but account is generally taken of other parameters for producing $t_i$.

In particular, an enrichment, i.e. an increase in the duration of the signal $t_i$, is provided at full load.

It is known that full load, which generally corresponds to full opening of the gas throttle, can be detected by the difference between the absolute pressure in the intake pipe and atmospheric pressure.

A device is added to the computer 1 so that the latter actuates a sudden increase in $t_i$ when the difference between atmospheric pressure and the absolute pressure in the intake pipe becomes less than a certain value, for example 40 mm.Hg namely substantially $5.3.10^3$ Pascal.

For certain engine speeds, the enrichment at full load is actuated before the full opening of the throttle, which generates a sudden increase in $t_i$ capable of causing changing down from 5th to 4th. To understand it better, it suffices to refer to FIG. 9 where it is seen that an increase of $t_i$ at constant N can cause the curve 32 to be reached on which the changing down from 5th to 4th is effected.

At the abovesaid speeds the enrichment at full load can be actuated at a relatively slight opening of the throttle, 50° for example. In the neighborhood of this opening of the throttle, a relatively considerable variation in the duration $t_i$ will correspond to a slight variation in the said opening since the full load enrichment can be added, or not, to the duration of the injection control signal.

As a result, at these engine speeds, there is a high sensitivity to the accelerator pedal for the passage from 5th to 4th and changing down can occur although it is not indispensable.

Figure 11:
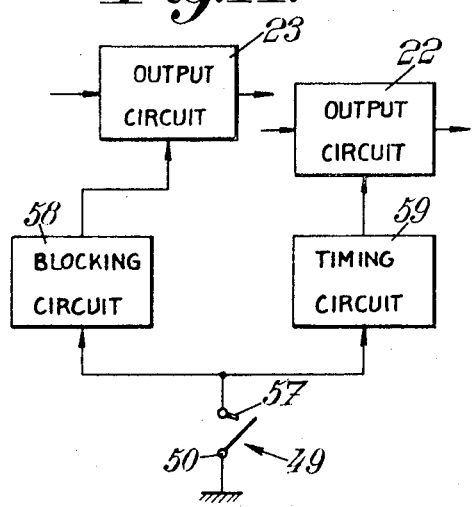
FIG. 11 shows diagrammatically a device adapted to cause to come into operation or not the direction of the injection signal, for the passage through one speed, from a certain angle of opening of the gas throttle.

To overcome this drawback, there is advantageously used a contactor 49 (FIGS. 11 and 12) mounted on the spindle 50 of the gas throttle valve. The contactor 49 is adapted to ground a conductor sector 57, when the opening of the throttle is greater than an angle $\alpha$ of the order of 60°.

Figure 12:
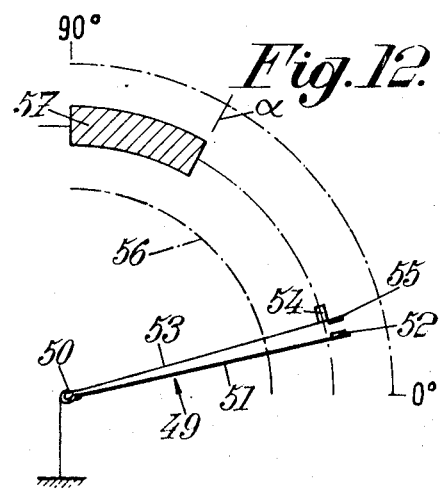
FIG. 12 is a view of a detail of FIG. 11.

The contactor 49 comprises a rotating arm 51, which is an electrical conductor, connected to electrical ground. The end of the arm 51 remote from the axle 50 bears a contact stud 52 (FIG. 12).

A second rotary arm, insulating, 53 is connected flexibly to the arm 51. The arm 53 bears, at its end remote from the axle 50 a cursor 54 which is conductive of electricity and connected electrically to a contact stud 55 located facing the stud 52.

In resting position, the arms 51 and 53 are spaced angularly from one another and the studs 52, 55 are not in contact. When the accelerator pedal is pressed the arm 51 turns in anti-clockwise direction. The arm 53 is braked by the friction of the cursor 54 on a track 56, the arm 51 approaches the arm 53 and the stud 52 comes into contact with the stud 55. When the foot is released from the accelerator, i.e. on closing of the butterfly valve, the studs 52, 55 separate from one another.

The sector 57 extends from the angle $\alpha$ to the maximum opening (90°) and is connected to the input of a circuit 58 (FIG. 11) adapted to actuate, when its input is not grounded, the locking of the circuit 23 producing the voltage, which depends on the duration of injection $t_i$, suitable for modifying the threshold of the detector 8 actuating changing down of the gears.

In known manner, the track 56 can be constituted by a printed circuit of which certain parts are grounded, by means of the contact stud 52 and the cursor 54, which enables the actuation on the circuits of the computer 1 adapted to control, e.g., an enrichment on starting up, or by means of a contact (not shown) which is closed when the throttle valve is closed, which enables actuation of the circuit 33 controlling the injection cut-off and/or actuation of a circuit controlling an idling correction on lifting the foot.

The operation of the assembly is as follows.

When the opening of the throttle is less than $\alpha$, the circuit 58, of which the input is not grounded, locks the circuit 23. The changing up and changing down thresholds of the detector 8 no longer depends on the time of the duration of injection $t_i$ and remain equal to the normal thresholds of the detector.

When the opening of the throttle is greater than $\alpha$, the circuit 23 is unlocked and the threshold of the detector is modified, as previously described according to the value of $t_i$.

Due to the fact that the grounding of the input of the circuit 58 only takes place when the studs 52, 55 come into contact, i.e. on opening the throttle, there is advantageously provided a timing circuit 59 (FIG. 11), of which the output is connected to the circuit 22, the latter, it will be recalled, acting on the changing up threshold of the detector 7 which actuates passage from 4th to 5th gear. The time-delay circuit 59 masks, in the circuit 22, a very slight closing of the throttle valve in order to ensure the holding of the 4th gear for several seconds and to avoid repeated changes 5th → 4th → 5th . . .

In FIG. 14 there is shown a time-delay device 60 for permitting passage from 5th.

It has been explained that authorization of passage from 5th gear was given by closing of the contact 47 on passage of the manual selector at the "4th" position. Referring to FIG. 7, it is seen that the closing of the contact 47 immediately grounds the stage 38.

In the case of FIG. 14, the device 60 comprises an NPN transistor 61 of which the emitter is connected to a contact terminal 47 and the collector to the output of the stage 38. The base of the transistor is connected to the output of a monostable time-delay circuit 62 of which the input is connected to the emitter of the transistor. Such monostable time delay circuits are well-known (see, for example, the abovementioned book by Schrieber, pages 301 and 302.

The closing of the contact 47 causes immediate change-over of the circuit 62 which blocks the transistor 61. The stage or relay 38 is hence not connected to ground and current cannot pass in the said stage.

At the end of the time fixed by the time constant, the circuit 62 resumes its stable state and the transistor 61 becomes conductive. The relay 38 is then grounded and passage from 4th to 5th becomes possible.

This device enables direct passage from 3rd to 5th to be avoided.

In FIG. 15, lastly, there is shown diagrammatically a device enabling the holding of 4th gear when the driver of the vehicle lifts his foot from the accelerator.

The device comprises an "AND" gate 63 with two inputs. The input 64 is affected by a signal when the 4th gear is engaged. The input 65 is affected by a signal when the foot is lifted from the accelerator. This signal is obtained by closing a contact (not shown) serving to control the injection cut-off on "raising the foot".

The output of the gate 63 is connected to the input of a circuit 66 for preventing the changing up to 5th gear. The output of this circuit is connected to the bistable flip-flop 36.

When the input of the circuit 66 receives a signal, i.e. when the 4th gear is engaged and the foot is raised from the accelerator, the said circuit 66 prevents passage to state "1" of the output 37 and hence engagement of 5th gear.

In this way it is possible to preserve the maximum braking power of the engine in the case of deceleration or braking by avoiding a possible changing into fifth gear.

The electronic control device for multistage gear boxes according to the invention is particularly simple and inexpensive since it uses information from the electronic computer already provided for the injection. There is as a result a substantial economy of equipment.

The control of gear changes is governed directly by operating parameters of the engine, especially by the rotary speed of the engine and by the absolute pressure in the intake pipe.

In addition, the relationships for changing up and changing down of gears can easily be modified (curves 31, 32 of FIGS. 8 and 9) by acting on the electronic circuits which treat the signal 4 of the rotary speed of the engine and the signal 6 of the injection control. There is as a result a very great flexibility of adaptation in the vehicle.

As is self-evident and as emerges already from the preceding description, the invention is in no way limited to those of its methods of application and construction which have been more especially envisaged; it encompasses, on the contrary, all variations.

I claim:

1. In an electronic fuel injection automobile engine having a multi-ratio gear box, said engine having fuel injection valves and an electronic computer producing from operating parameters of the engine, a fuel injection control signal whose duration determines the time of opening of the fuel injection valves, an electronic control device comprising modifying means actuated by said injection control signal as a function of its duration, said device comprising at least one speed threshold detector, said speed threshold detector being sensitive to the rotary speed of the engine, and providing a signal to actuate the changes in ratios of the gear box on passage of said rotary speed of the engine through a speed threshold, said modifying means governing said speed threshold.

2. Electronic control device according to claim 1, comprising two speed threshold detectors of which one actuates changing-up of gears speeds and the other actuates the changing-down of gears.

3. Electronic control device according to claim 28, comprising a sawtooth generator piloted by the injection control signal and delivers a peak voltage proportional to the duration of the injection control signal, a memory retains said peak voltage, and a circuit acts on at least one speed threshold of the speed threshold detector as a function of said peak voltage.

4. Electronic control device according to claim 1, for an electronic fuel injection vehicle whose electronic computer provides data on the rotary speed of the engine in the form of a calibrated signal whose frequency depends on the rotary speed of the engine, said device comprising an integrator to transform said calibrated signal into a DC voltage proportional to the frequency of the said signal, which continuous voltage is applied to the input of said at least one speed threshold detector.

5. Electronic control device according to claim 4, comprising two voltage dividers, whose inputs are subjected to said DC voltage and whose outputs are connected respectively to the input of the speed threshold detector for changing-up and to the input of the speed threshold detector for changing-down of gears.

6. Electronic control device according to claim 3, modifying in different ways the peak voltage delivered by the sawtooth generator, the two modified voltages acting respectively on the speed threshold detectors for changing-up and for changing-down of gears.

7. Electronic control device according to claim 1, comprising an electronic adder-subtractor whose number of stages is equal to the number of forward gears of the gear box, the output of each stage of the adder-subtractor actuates a member, actuating the passage through a gear and, the output pulses from said at least one speed threshold detector being arranged to actuate the successive changes in state of the adder-subtractor.

8. Electronic control device according to claim 1, acting only on the passage between the highest ratio of the gear box and the ratio immediately below and comprising a flip-flop actuated by the output pulses from said at least one speed threshold detector, said flip-flop itself actuating a member, to actuate the passage from one gear ratio to the other.

9. Electronic control device according to claim 1, comprising a single hysteresis speed threshold detector actuating both changing-up and changing-down of gears.

10. Electronic control device according to claim 1 actuating, at the same time as the change-up from one speed, a momentary cup-off of the fuel injection, which prevents the racing of the engine during the declutching phase.

11. Electronic control device according to claim 8, comprising a safety circuit preventing retrogression from the highest ratio to the ratio immediately below, above a certain speed of the engine.

12. Electronic control device according to claim 8, comprising a circuit controlling the locking of a manual selector, provided for the passage from the lower ratios when the speed of the engine is greater than a certain level and when the upper ratio of the gear box is engaged.

13. Electronic control device according to claim 8, comprising a device permitting modification of the speed threshold of the speed threshold detector actuating changing-down, as a function of the duration of the time of injection, only when the opening of the gas butterfly valve of the engine is greater than a certain angle, said device comprising a contact, mounted on the axle of the gas butterfly valve, grounding a conductive system when the opening of the butterfly valve is sufficient, said system being connected to the input of a circuit opposing modification of the speed threshold of said speed threshold detector, when its input is not grounded.

14. Electronic control device according to claim 2, comprising a sawtooth generator piloted by the injection control signal and delivers a peak voltage proportional to the duration of the injection control signal, a memory retains said peak voltage, and a circuit acts on at least one speed threshold of the speed threshold detector as a function of said peak voltage.

15. Electronic control device according to claim 6, comprising an electronic adder-subtractor whose number of stages is equal to the number of forward gears of the gear box, the output of each stage of the adder-subtractor being arranged to actuate a member, actuating the passage through a gear and, the output pulses from said at least one speed threshold detector actuates the successive changes in state of the adder-subtractor.

16. Electronic control device according to claim 7, wherein said member is an electromagnet.

17. Electronic control device according to claim 7, wherein said member is an electrovalve.

18. Electronic control device according to claim 8, wherein said member is an electromagnet.

19. Electronic control device according to claim 8, wherein said member is an electrovalve.

20. Electronic control device according to claim 10, acting only on the passage between the highest ratio of the gear box and the ratio immediately below and comprising a flip-flop actuated by the output pulses from said at least one speed threshold detector, said flip-flop itself actuating a member, to actuate the passage from one gear ratio to the other.

21. Electronic control device according to claim 20, comprising a safety circuit preventing retrogression from the highest ratio to the ratio immediately below, above a certain speed of the engine.

22. Electronic control device according to claim 20, comprising a circuit controlling the locking of a manual selector, provided for the passage from the lower ratios when the speed of the engine is greater than a certain level and when the upper ratio of the gear box is engaged.

23. Electronic control device according to claim 11, comprising a circuit controlling the locking of a manual selector, provided for the passage from the lower ratios when the speed of the engine is greater than a certain level and when the upper ratio of the gear box is engaged.

24. Electronic control device according to claim 20, comprising a device permitting modification of the speed threshold of the speed threshold detector actuating changing-down, as a function of the duration of the time of injection, only when the opening of the gas butterfly valve of the engine is greater than a certain angle, said device comprising a contact, mounted on the axle of the gas butterfly valve, grounding a conductive system when the opening of the butterfly valve is sufficient, said system being connected to the input of a circuit opposing modification of the speed threshold of said speed threshold detector, when its input is not grounded.

25. Electronic control device according to claim 12, comprising a device permitting modification of the speed threshold of the speed threshold detector actuating changing-down, as a function of the duration of the time of injection, only when the opening of the gas butterfly valve of the engine is greater than a certain angle, said device comprising a contact, mounted on the axle of the gas butterfly valve, grounding a conductive system when the opening of the butterfly valve is sufficient, said system being connected to the input of a circuit opposing modification of the speed threshold of said speed threshold detector, when its input is not grounded.

* * * * *

UNITED STATES PATENT OFFICE
CERTIFICATE OF CORRECTION

Patent No. 3,741,042　　　　　　　　　Dated June 26, 1973

Inventor(s) Raymond RAVENEL

It is certified that error appears in the above-identified patent and that said Letters Patent are hereby corrected as shown below:

Page 1, the assignee should read --Société Anonyme Automobiles Citroen--.

Fig. 1, the section at the lower right side should be

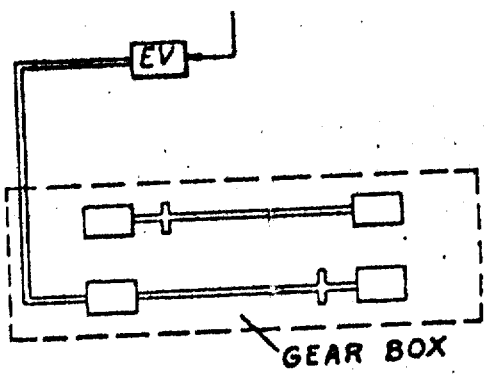

Claim 3, line 1, "28" should read --1--.

Signed and sealed this 27th day of November 1973.

(SEAL)
Attest:

EDWARD M. FLETCHER, JR.　　　　　　RENE D. TEGTMEYER
Attesting Officer　　　　　　　　　Acting Commissioner of Patents